UNITED STATES PATENT OFFICE.

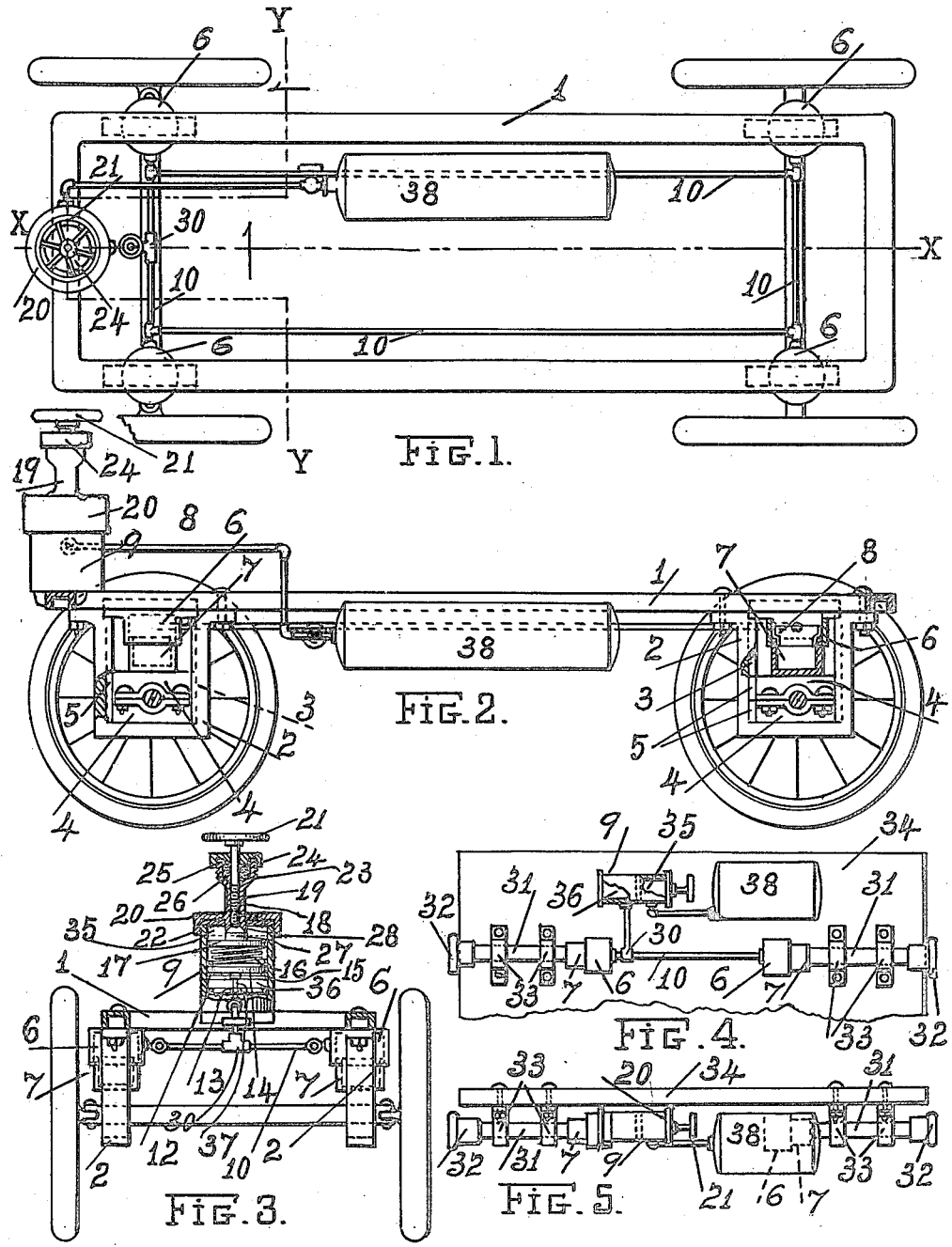

CHARLES MARTENS, OF SPRINGFIELD, ILLINOIS.

SHOCK-ABSORBER.

1,301,474.    Specification of Letters Patent.    Patented Apr. 22, 1919.

Application filed July 30, 1918. Serial No. 247,447.

*To all whom it may concern:*

Be it known that I, CHARLES MARTENS, a citizen of the United States, residing at Springfield, in the county of Sangamon and State of Illinois, have invented a new and useful Shock-Absorber, of which the following is a specification.

The invention relates to shock absorbers for vehicles such as automobiles, railroad cars, etc., and is applicable alike to the running gears of the vehicles, or to other parts subject to direct shock, such as the drawbars of engines, cars, etc.

The broad purpose of the invention is to utilize two fluids of different compressibility, such as air and water; or air and alcohol; or air and oil; or steam and oil, etc., co-acting under pressure, instead of the high tension springs hitherto used in shock absorbers.

More specific purposes of the invention are: to provide first or single fluid cushioning devices in immediate proximity to the parts primarily receiving the shocks and to provide a two-fluid cushioning and shock absorbing device adapted to receive and absorb the shocks transmitted through the fluid of a number of said first or single-fluid cushioning devices to said two-fluid cushioning and absorbing device; and to provide improved structural details, as will hereinafter appear.

The invention is illustrated in the annexed drawings, to which reference is hereby made, and will now be described in detail and the novel features thereof will be recited in the claims.

I will first describe the invention as applied to an automobile, and later will describe a modified embodiment of the invention as applied to the drawbars of a car.

Figure 1 is a diagram showing a top plan of the frame of an automobile equipped with shock absorbers embodying my invention;

Fig. 2 is a vertical longitudinal section on the X. X. of Fig. 1.

Fig. 3 is a vertical transverse section on the line Y. Y. of Fig. 1.

Fig. 4 is a diagram showing the bottom plan of a pair of drawbars equipped with two-fluid shock absorbers; and Fig. 5 is a diagram showing a side elevation of the same parts that are shown in Fig. 4.

The same reference numerals designate the same parts in all the views.

The equipment for a vehicle comprises a plurality of pairs of one-fluid cylinders, and one two-fluid cylinder co-acting with any one or all the pairs of one-fluid cylinders. The pairs of one-fluid cylinders and appurtenances are all alike; so a description of one pair will suffice for all.

The vehicle frame 1 may be of any usual or approved construction. Hangers 2 are stationary on the under side of the frame 1 and have vertical channels 3 (Fig. 2.) Axle boxes 4 have flanges 5 adapted to slide in the channels 3 to guide vertical movement of the axle boxes in the hangers.

Below the frame 1 and between the hangers 2 is a stationary first cylinder 6. On top of the upper axle box is a second cylinder 7 fitted to telescope in the cylinder 6. A leather packing ring 8 fixed on the cylinder 7 and slidable in the cylinder 6 prevents leakage of fluid between the outer wall of the cylinder 7 and the inner wall of the cylinder 6. The cylinders 6 and 7 together constitute a pair of one-fluid cylinders.

A third cylinder 9, which is a two-fluid cylinder, is stationary in any suitable position on the vehicle and communicates through pipes 10 with the interiors of the respective pairs of one-fluid cylinders.

A T 30 is stationary on the cylinder 9 and communicates with the water compartment of the cylinder.

Pipes 10 connect the cylinders 6 with the T 30 and with each other, so that the water compartment of the cylinder 9 and all the cylinders 6 and 7, may be kept full of water, in order that when shock is applied on any pair of cylinders 6 and 7, some of the water from that pair of cylinders may flow through the pipes 10 into the water chamber of the cylinder 9 and increase the volume of water therein.

The one-fluid cylinders 6 and 7 and the two-fluid cylinder 9 are all on one pipe line, hence any shock received by any one-fluid cylinder will be transmitted to and in part borne by all the other cylinders.

A piston 14, adapted to slide in the cylinder 9, divides the cylinder into an upper compartment 35 to contain compressed air, or steam, or other expansible gas, and a lower compartment 36 adapted to contain water or oil, or other relatively incompressible fluid. A spider 12 is stationary in the cylinder 9 and has a central opening 13 accommodating the piston stem 37, and the stem sliding in the opening guides and steadies the movement of the piston.

Water or oil, or other relatively incompressible fluid may be poured into the cylinder 9 before the piston 14 is inserted, to fill the cylinders 6 and 7, the pipes 10 and that part of the cylinder 9 which constitutes the compartment 36.

Packing rings 15 on both sides of the piston prevent leakage of gas or fluid from one chamber into the other.

The reservoir 38, of usual construction, is adapted to contain compressed air or other expansible fluid, introduced into the reservoir by any usual or suitable means, not shown.

If compressed air from the reservoir 8 be used in the compartment 35, and water or oil be used in the compartment 36, the pipes 10 and the cylinders 6 and 7, any shock applied on either vehicle axle will be transmitted by the column of water, or oil, etc., in the cylinders 6 and 7, and the pipes 10 into the compartment 36 and the water will act to slide the piston 14 in the cylinder 9 to further compress the air in the compartment 35 and the compressed air will react upon the piston, which in turn will act on the water column to restore the moved parts to their original position.

Use of one liquid.

Under some conditions it may be desired to use only one liquid, for example oil, in all the cylinders 6, 7 and 9. In such cases I use a helical spring 16 in the cylinder 9 to absorb the shock, and means for varying the spring pressure according to the circumstances of use. The means for varying the spring pressure will now be described. The fluid streams (preferably oil) from all the cylinders 6 and 7 will be united in the cylinder 9 and will act against one face of the piston 14. I have shown a vertical cylinder 9, but it is to be understood that the cylinder may be horizontal, or may occupy any inclined position between the horizontal and the vertical, as may be most convenient in practice, without departure from my invention. The cylinder head 20 screws onto the body 9, and has an internal screw threaded hub 19 provided with a packing gland 23. A cap 24 screws onto the outer end of the hub and has an integral follower 25 adapted to compress fibrous packing 26 in the gland 23. A gasket 22 between the cylinder head and the adjacent end of the cylinder forms an air tight juncture of the cylinder head with the cylinder. An adjusting screw 18 engages the internal screw threads of the hub and the inner end of the screw is connected with a follower 17 which is adapted to slide inwardly or outwardly according to the adjustment of the screw and has a tapered hub 27 which seats on a flared seat 28 at the inner end of the hub 19 when the screw is turned upward to the full extent and forms an air tight juncture of the follower with the inner end of the hub. Normally the stress of the spring 16 will be such that the spring will absorb all the shocks transmitted by the fluid from all the cylinders 6 and 7 and acting on the face of the piston 14. If the stress of the spring is insufficient to absorb all the shocks the hand wheel 21 will be rotated to move the screw 18 inwardly to act on the follower 17 to slide it inwardly against the spring and increase the stress of the spring to such extent that the spring will absorb all the shocks. Reversely, if the spring is too strong the screw 18 will be retracted to diminish the stress of the spring.

If compressed air or steam be used in the cylinder 9, the spring 16 may be dispensed with and in that case the screw 18 will be turned outwardly to cause the hub 27 to bear firmly on the seat 28 at the inner end of the hub 19 to prevent leakage from the cylinder.

Modified construction.

I will now describe the modified construction shown diagrammatically in Figs. 4 and 5.

Numeral 34 designates the bottom of a car as viewed from below. Drawbars 31 of usual construction are equipped with coupler heads 32 and are adapted to slide inwardly in stationary guides 33 on the bottom of the car. A pair of one-fluid cylinders 6 and 7, already described in detail, are adjacent to the inner end of each drawbar and in line with the drawbars. Pipes 10, connected by a coupling 30, communicate with the interiors of the cylinders 6 and 9. Shocks applied at the outer ends of the coupler-heads will cause the bars 31 to engage on the outer ends of the cylinders 7 to slide the cylinders 7 in the cylinders 6 to force fluid through the pipes 10 into the cylinder 9 to compress air therein and the compressed air will react through the column of fluid in the pipes 10 and the cylinders 6 and 7, to restore the parts to their original position.

Use of terms.

For convenience in description and recital in the claims I have herein designated the chamber on one side of the piston in the two-fluid cylinder, as the air-chamber and the chamber on the opposite side of the same piston, as the water-chamber. This designation is accurate if compressed air and water be used. If other two co-acting fluids be used, it is to be understood that the term "air chamber" includes any chamber adapted for the use of compressed air, or other expansible fluid such as steam or other vapor;

and the term "water-chamber" includes any chamber adapted for the use of any relatively incompressible and practically non-freezing fluid such as oil, or alcohol, or the like.

*Claims.*

Having fully described my invention, what I claim as new and desire to secure by Letters Patent is:

1. A two-fluid shock absorber for vehicles, comprising a stationary hanger, an axle box adapted to slide in the hanger; a stationary first cylinder within the hanger; a second cylinder mounted on the axle box and adapted to telescope in said first cylinder; a third cylinder in operative relation to said telescoping first and second cylinders and containing a relatively non-compressible fluid; a spider stationary in said third cylinder and having a central opening adapted to accommodate a slidable stem; a piston adapted to slide in said third cylinder and having a stem adapted to slide in the central opening of the spider; packing on both sides of said piston; means for conveying said non-compressible fluid from said third cylinder into said telescoping first and second cylinders; and means for supplying on one side of said piston a compressed fluid such as compressed air acting to oppose movement of said piston in one direction.

2. In a shock absorber, the combination of a two-fluid cylinder comprising a first chamber containing non-compressible fluid such as water, and a second chamber containing compressible fluid such as compressed air; a piston slidable between said chambers of the two-fluid cylinder; telescoping cylinders containing non-compressible fluid, and in communication with the first chamber of said two-fluid cylinder; and axle boxes acting on said telescoping cylinders to force fluid from the telescoping cylinders into the first chamber of said two-fluid cylinder against the pressure of the compressible fluid in the second chamber of said two-fluid cylinder.

3. In a shock absorber, the combination of a two-fluid cylinder having a slidable piston dividing the cylinder into a variable air chamber and a variable water chamber containing water; means for supplying compressed air in the air chamber of said cylinder; a plurality of pairs of telescoping cylinders filled with water from the water chamber of said two-fluid cylinder, and movable shock-receiving members adapted to act on the respective movable members of the telescoping cylinders to force water from the telescoping cylinders into the water chamber of said two-fluid cylinder against the pressure of air in the air chamber of said two-fluid cylinder.

4. In a shock absorber, a two-fluid structure comprising a cylinder, an air chamber and a water chamber separated by a piston slidable in the cylinder; in combination with means for supplying expansible fluid under pressure in the air chamber of said two-fluid structure; telescoping cylinders filled with fluid supplied from said water chamber; and shock-receiving members acting on said telescoping cylinders to transmit shocks through the fluid in said telescoping cylinders and in said water chamber against said piston to compress the expansible fluid in said air chamber to absorb the shock; said expansible fluid reacting against said piston to effect outward movement of the telescoping cylinders.

In witness whereof I have hereunto signed my name at Springfield, Illinois, this 11th day of June, A. D. 1918.

CHARLES MARTENS.

Witnesses:
ROY SCHNEPP,
S. ALLYNN TROXELL.